United States Patent [19]
Messmer

[11] 3,848,358
[45] Nov. 19, 1974

[54] PLANT TERRARIUM

[75] Inventor: James I. Messmer, Southfield, Mich.

[73] Assignee: Florists' Transworld Delivery Association, Detroit, Mich.

[22] Filed: Mar. 27, 1973

[21] Appl. No.: 345,276

[52] U.S. Cl............. 47/34, 47/29, 206/45.34, 206/507, D35/3
[51] Int. Cl............. A01g 9/02, B65d 25/00
[58] Field of Search............ 47/17, 19, 27, 28, 29, 47/30, 31, 32, 34, 34.11, 26; 206/46 PL, 45.34; 220/97 D, 42, 75, 76; D9/125, 126, 131, 154, 164, 240, 237; D35/3 R, 3 A, 3 C; 312/284

[56] References Cited
UNITED STATES PATENTS

| | | | |
|---|---|---|---|
| 661,411 | 11/1900 | Lonitz | 47/38 |
| 757,045 | 4/1904 | Lane | 47/27 X |
| 1,587,167 | 6/1926 | Marsden | 47/34 UX |
| 2,742,181 | 4/1956 | Jarund | 220/97 D |
| 3,106,801 | 10/1963 | Risacher | 47/19 X |
| 3,137,095 | 6/1964 | Pearson | 47/33 |
| 3,226,881 | 1/1966 | Garrett | 47/30 |
| 3,362,590 | 1/1968 | Martin | 220/42 B |

Primary Examiner—Robert E. Bagwill
Assistant Examiner—Steven A. Bratlie
Attorney, Agent, or Firm—Hauke, Gifford, Patalidis & Dumont

[57] ABSTRACT

A terrarium for storing, displaying and growing plants comprising a container for the plant to be grown and a transparent cover which fits over and is supported on the container. The cover may be placed over the container and stably supported thereby in two different positions. In the first position the cover mates with the container to form an enclosure. In the second position the cover is rotated from the mating position to form ventilation openings between the cover and the container.

7 Claims, 3 Drawing Figures

PATENTED NOV 19 1974　　　　　　　　　　　3,848,358
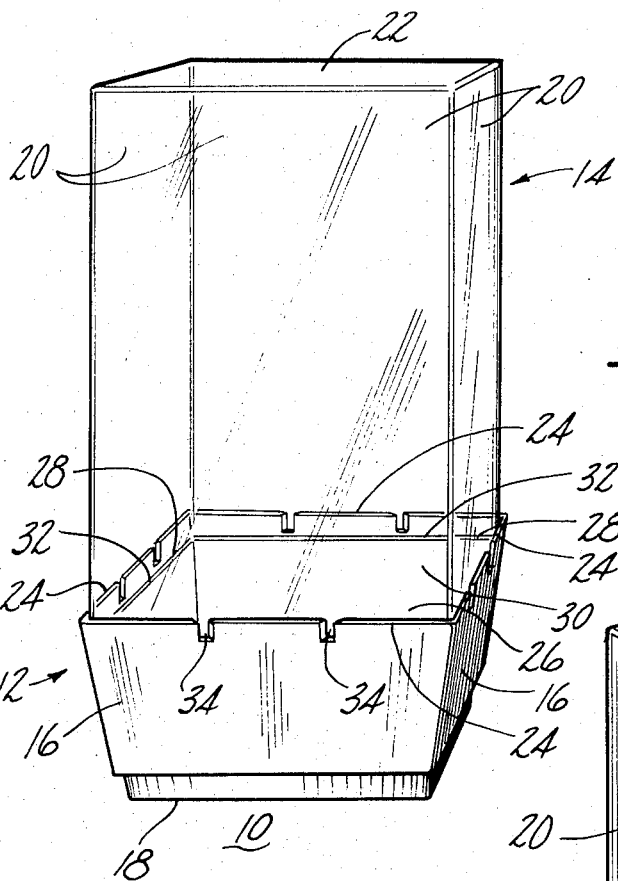
*Fig-1*
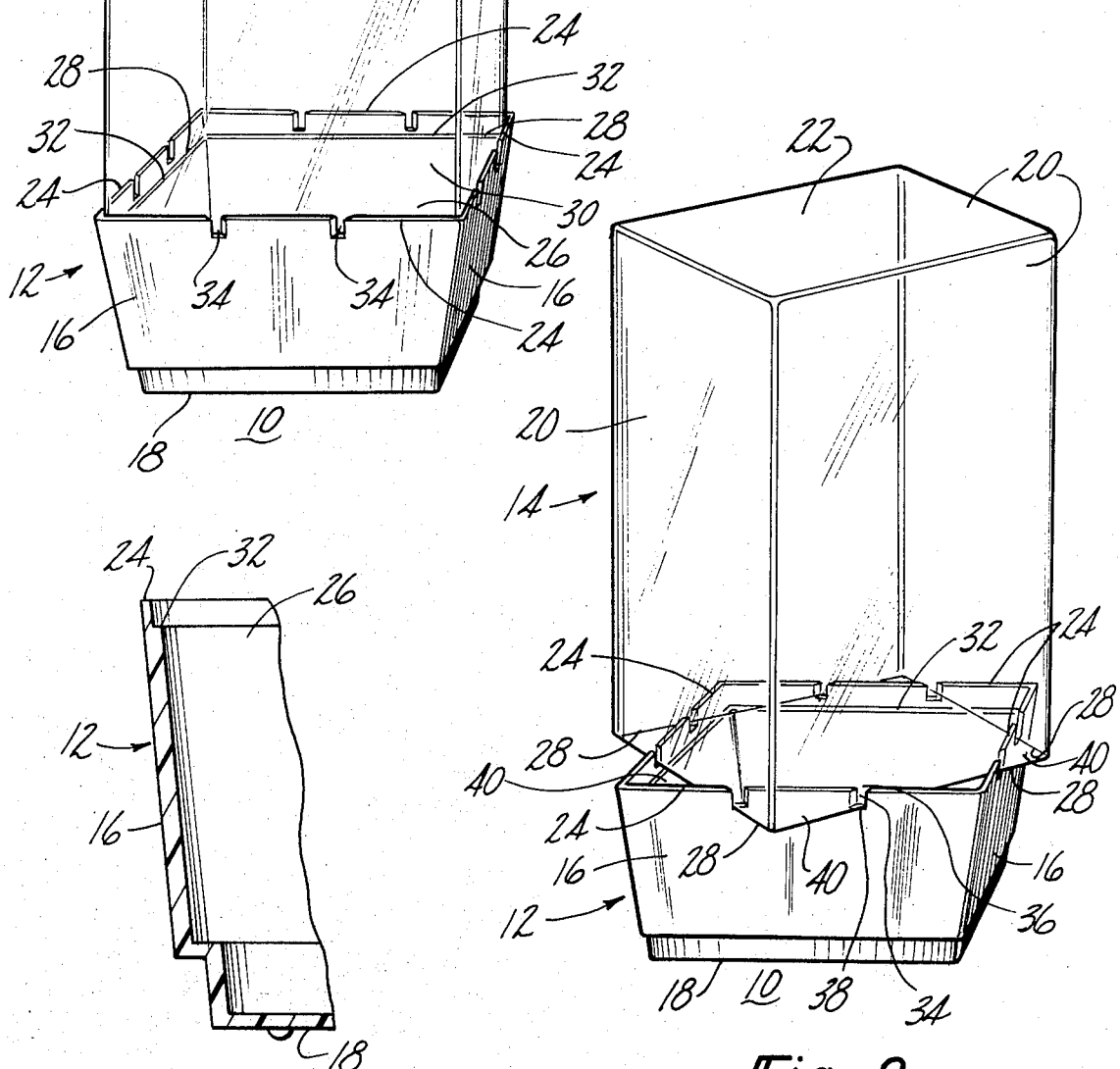
*Fig-2*
*Fig-3*

3,848,358

PLANT TERRARIUM

BACKGROUND OF THE INVENTION

1. Field of the Invention

The present invention relates to pots, boxes and other receptacles in which plants are grown. More particularly, the invention relates to a novel closable container for displaying, storing and growing plants in which means are provided for selective ventilation of the plants within the container.

2. Description of the Prior Art

A number of plant growing containers are found in the prior art. One such container, as shown in U.S. Pat. No. 3,314,194 issued on Aug. 10, 1964 to F. E. Halleck has a hood or dome which is connectable to a receptacle or base in a single position and includes a hole centrally located in the top wall of the dome for ventilation.

Another such container, as shown in U.S. Pat. No. 2,720,725 issued on Oct. 18, 1955 to S. A. Peerless has a receptacle for the plant and a lid. Ventilation holes are provided in the side walls of the receptacle and are opened only when the lid is inverted from its stored position to its in-use position. Further, the lid must be in its in-use position to provide adequate growing room for the plant, which necessarily means that when the plant is growing the vent holes are not closable by an interaction of the receptacle and lid.

No prior device known to me provides the combination of attributes of the present invention, i.e., a simple, inexpensive plant terrarium which has a cover selectively positionable on a container to open and close ventilation openings while the plant is growing in order to control the environment in which the plant is growing.

SUMMARY OF THE INVENTION

The present invention provides a plant growing terrarium having a container for the plant to be grown and a cover which is stably supported over the container in either of two selected positions. The container and the cover each have side walls. The container has an open top and the cover has an open bottom which are of substantially similar peripheral shapes. Two support means are provided to stably support the cover over the container in two different positions. When the cover is supported over the container in the first position the cover completely encloses the open top of the container. When the cover is supported over the container in a rotated position by the second support means the bottom opening of the cover and the top opening of the container are contiguous and preferably concentric, but the cross sectional shapes of the cover and container are in a mismatching relationship. This mismatching relationship provides ventilation openings to the interior of the terrarium. This capability of the cover to be stably supported in two different positions relative to the container permits the environment of the interior of the terrarium to be controlled by selectively changing the position of the cover from the first position to the second position to produce a closed terrarium or a ventilated terrarium as growing conditions dictate.

BRIEF DESCRIPTION OF THE DRAWINGS

One preferred embodiment of the invention is illustrated in the accompanying drawing in which like numerals refer to like parts throughout the several views and in which:

FIG. 1 is a perspective view of a terrarium of the present invention with its cover supported over its container in a first position by a first support means to form an enclosure;

FIG. 2 is a perspective view of the terrarium of FIG. 1 with its cover supported over its container in a second position by a second support means to form ventilation openings therebetween; and FIG. 3 is a fragmentary cross-sectional view of the container of FIGS. 1 and 2.

DETAILED DESCRIPTION

A preferred plant terrarium of the present invention, generally denoted as 10, is illustrated in FIGS. 1 and 2. The terrarium 10 comprises a container 12 for the plant to be grown and a cover 14 which is adapted to be supported by the container 12. For exemplary purposes the container 12 is shown as having four side walls 16 and a bottom wall 18, and the cover 14 is shown as having four side walls 20 and a top wall 22. However, it will be apparent as the description proceeds that the container 12 and cover 14 could be of different cross-sectional shapes than that illustrated.

The container side walls 16 have top edges 24 which define a top opening, generally denoted as 26, to the interior of the container 12. The cross-sectional shape of the top opening 26 is illustrated in the embodiment shown as being generally square although as will be apparent it could be of different cross-sectional shape as well.

The cover side walls 20 have bottom edges 28 which define a bottom opening, generally denoted as 30, to the interior of the cover 14. The cross-sectional shape of the bottom opening 30 is also illustrated as being generally square. The only criteria for the cross sectional shapes of the top opening 26 and the bottom opening 30 is that they be substantially the same.

First support means, such as a ledge 32, projects inwardly of the container 12 from the interior surface of each of the side walls 16. This ledge 32 may be a separate component inserted into the container 12, or, as best illustrated in FIG. 3, may be integral with the side walls 16. The cover 14 is illustrated in FIG. 1 in a first position on the container 12. In this first position the bottom edges 28 of the cover are received on the ledge 32 to stably support the cover 14 over the container 12 such that the bottom opening 30 and the top opening 26 are substantially contiguous and concentric, and the edges 24 and 26 are aligned. In this position the container 12 and the cover 14 cooperate to form a closed terrarium.

Second support means, such as a plurality of slots 34 are defined in the container side walls 16. Each of these slots 34 have one end 36 open to a top edge 24 of the container, and an opposite end 38 which terminates between the top edge 24 and a ledge 32. In FIG. 2 the cover 14 is illustrated as being supported on the container 12 in a second position. In this second position, the slots 34 receive the bottom edges 28 of the cover 14 to stably support the cover 14 over the container 12 such that a portion of the top opening 30 is contiguous with a portion of the top opening 26, the bottom opening 30 and top opening 26 are concentric, and the cross-sectional shapes of the top opening 26 and bottom opening 30 are in mismatched relationship, i.e., the bottom opening 30 is rotated relative to the top opening 26 so that the edges 24 and 28 are not aligned with each other. In this second position, openings 40 are formed to the interior of the terrarium 10 between portions of the bottom edges 28 of the cover 14 and portions of the top edges 24 of the container 12.

In the embodiment illustrated, the side walls 16 of the container 12 slope generally outwardly from the bottom wall 18 to the top edges 24 so that a plurality of the bases may be nested one in another for ease in shipping.

The cover 14 should be fabricated of a transparent material so that light may reach the plant enclosed by the terrarium for the photosynthesis process to take place, and, of course, so that an observer may view the plant with the cover in place.

When the plant is growing, the cover 14 may be selectively positioned either in the first or second position to close or open ventilation openings as required to control the environment immediately surrounding the growing plant without disturbing it.

It is apparent that although the container opening 26 and the cover opening 30 have been disclosed as being generally square in cross-section, other configurations of these openings are also possible. All that is necessary is that in one position the cover 14 be supported to close the opening 26 and in another position ventilation be provided through the opening 26 to the interior of the terrarium.

The foregoing detailed description is given primarily for clarity of understanding and no unnecessary limitations should be understood therefrom, for other modifications will be obvious to those skilled in the art and may be made without departing from the spirit of the invention or the scope of the appended claims.

I claim:

1. A terrarium for storing and growing a plant, said terrarium comprising: a container for the plant having side walls provided with a top edge defining a top opening to the interior of said container; a cover for said container, said cover having side walls provided with a bottom edge defining a bottom opening to the interior of said cover; said container top opening having a cross-sectional shape defined by said top edge; said cover bottom opening having a cross-sectional shape defined by said bottom edge; first support means to stably support said cover over said container in a first position such that said container top opening and said cover bottom opening are substantially contiguous and concentric and said cross-sectional shapes are in matching relationship to form an enclosure; and second support means to stably support said cover over said container in a second position such that the container top opening and the cover bottom opening are in mismatching relationship to provide an opening to the interior of said terrarium between said bottom edge and said top edge, wherein said first support means is a ledge projecting from said container side walls proximate said top edge for receiving thereon said bottom edge of said cover to stably support said cover over said container, said second support means is a plurality of slots defined in said container side walls, each of said slots having one end open to said top edge of said container side walls to receive therein said bottom edge of said cover to stably support said cover over said container and each of said slots having an end opposite said open end terminating between said top edge of said container side walls and said ledge.

2. A terrarium as defined in claim 1, wherein said ledge extends around the interior periphery of said container.

3. A terrarium as defined in claim 1, wherein said ledge is integral with said container sidewall.

4. A terrarium as defined in claim 1, wherein said container includes a bottom wall disposed at an opposite end thereof from said top opening; and said cover includes a top wall disposed at an opposite end thereof from said bottom opening.

5. A terrarium as defined in claim 1, wherein said container has at least three side walls; the included angle between any two adjacent container side walls is equal to the included angle between any other two adjacent container side walls; said cover has at least three side walls; the included angle between any two adjacent cover side walls is equal to the included angle between any other two adjacent cover side walls; and the included angle between any two adjacent container side walls is equal to the included angle between any two adjacent cover side walls.

6. A terrarium as defined in claim 1, wherein said cover is formed of a rigid, moisture impervious, light transparent material.

7. A terrarium as defined in claim 5, wherein said container side walls slope outwardly from said bottom wall towards said upper edges of said container side walls.

* * * * *